(12) United States Patent
Makino et al.

(10) Patent No.: US 10,891,354 B2
(45) Date of Patent: Jan. 12, 2021

(54) CATEGORIZING AND PROCESSING TIME-SERIES DATA

(71) Applicant: International Business Machines Corporation, Armonk, NY (US)

(72) Inventors: Yasue Makino, Sumida-ku (JP); Hiromi Kobayashi, Setagaya-ku (JP); Yusuke Matsumoto, Suginami-ku (JP); Hirokazu Kobayashi, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/987,660

(22) Filed: May 23, 2018

(65) Prior Publication Data
US 2019/0361956 A1 Nov. 28, 2019

(51) Int. Cl.
*G06F 17/18* (2006.01)
*G06F 8/30* (2018.01)
*G06F 17/17* (2006.01)
*G06F 17/14* (2006.01)

(52) U.S. Cl.
CPC .............. *G06F 17/18* (2013.01); *G06F 8/30* (2013.01); *G06F 17/17* (2013.01); *G06F 17/142* (2013.01)

(58) Field of Classification Search
CPC ........ G06F 17/18; G06F 17/17; G06F 17/142; G06K 9/00; G06K 9/00523; G06N 20/00
See application file for complete search history.

(56) References Cited

U.S. PATENT DOCUMENTS

| 8,255,346 | B2 | 8/2012 | Abe et al. |
| 2013/0116991 | A1 | 5/2013 | Hido |
| 2017/0211830 | A1 | 7/2017 | Kosaka et al. |

OTHER PUBLICATIONS

Zhu et al., Co-Clustering Structural Temporal Data with Applications to Semiconductor Manufacturing, 2014 IEEE International Conference on Data Mining, pp. 1121-1126 (Year: 2014).*

(Continued)

*Primary Examiner* — Toan M Le
(74) *Attorney, Agent, or Firm* — Kunzler Bean & Adamson (57) ABSTRACT

A method for performing responses based on time-series data includes receiving time-series data for each variable of a plurality of explanatory variables, determining a least common period for the plurality of explanatory variables, forming a plurality of explanatory variable groups using lags less than the least common period, determining one or more selected explanatory variable groups of the plurality of explanatory variable groups based on at least one information metric, receiving categorical data for a response variable corresponding to the plurality of explanatory variables, generating a response variable model using the selected explanatory variable groups, receiving additional time-series data corresponding to the selected explanatory variable groups, generating a categorization sequence for the additional time-series data using the response variable model, and performing one or more responses based on the categorization sequence. A corresponding computer program product and computer system are also disclosed herein.

19 Claims, 7 Drawing Sheets

(56) References Cited

OTHER PUBLICATIONS

Crone, Sven F., "Input variable selection for time series prediction with neural networks—an evaluation of visual, autocorrelation and spectral analysis for varying seasonality", The 1st European Symposium on Time Series Prediction, ESTSP'07, 2007, pp. 1-11.
Wikipedia, "Matching Pursuit", last edited on Jan. 21, 2018, pp. 1-5.
"Matching Pursuit Algorithms", Math Works, https://www.mathworks.com/help/wavelet/ug/matching-pursuit-algrithms, html, 2018, pp. 1-4.
Yan Liu, Temporal Causal Models for Massive Time-series Data Mining: Climate Change Attribution and other Applications, Japan-America Frontiers of Engineering Symposium, Jun. 6-8, 2011, pp. 1-26.
Lozano, Aurelie C. et al., "Group Orthogonal Matching Pursuit for Logistic Regression", Proceedings of the 14th International Conference on Artificial Intelligence and Statistics, 2011, pp. 452-460.
Temporal Causal Models, https://www.ibm.com/support.knowledgecenter/en/SSLVMB_23.1./components/tcm/tcm_intro.html, Apr. 19, 2018, 2 pp.

* cited by examiner

| t | T(t) | T(t+1) | T(t+2) | T(t+3) | T(t+4) | T(t+5) | V(t) | V(t+1) | V(t+2) | V(t+3) | P(t) | P(t+1) | P(t+2) | P(t+3) | P(t+4) | P(t+5) | S(t) |
|---|---|---|---|---|---|---|---|---|---|---|---|---|---|---|---|---|---|
| 20 | 370 | - | - | - | - | - | 154 | - | - | - | 499 | - | - | - | - | - | 0 |
| 19 | 339 | 370 | - | - | - | - | 132 | 154 | - | - | 472 | 499 | - | - | - | - | 0 |
| 18 | 389 | 339 | 370 | - | - | - | 104 | 132 | 154 | - | 497 | 472 | 499 | - | - | - | 0 |
| 17 | 344 | 389 | 339 | 370 | - | - | 157 | 104 | 132 | 154 | 506 | 497 | 472 | 499 | - | - | 1 |
| 16 | 405 | 344 | 389 | 339 | 370 | - | 131 | 157 | 104 | 132 | 502 | 506 | 497 | 472 | 499 | - | 1 |
| 15 | 349 | 405 | 344 | 389 | 339 | 370 | 116 | 131 | 157 | 104 | 503 | 502 | 506 | 497 | 472 | 499 | 0 |
| 14 | 413 | 349 | 405 | 344 | 389 | 339 | 159 | 116 | 131 | 157 | 506 | 503 | 502 | 506 | 497 | 472 | 0 |
| 13 | 356 | 413 | 349 | 405 | 344 | 389 | 126 | 159 | 116 | 131 | 502 | 506 | 503 | 502 | 506 | 497 | 0 |
| 12 | 414 | 356 | 413 | 349 | 405 | 344 | 109 | 126 | 159 | 116 | 478 | 502 | 506 | 503 | 502 | 506 | 1 |
| 11 | 345 | 414 | 356 | 413 | 349 | 405 | 155 | 109 | 126 | 159 | 442 | 478 | 502 | 506 | 503 | 502 | 1 |
| 10 | 395 | 345 | 414 | 356 | 413 | 349 | 120 | 155 | 109 | 126 | 444 | 442 | 478 | 502 | 506 | 503 | 0 |
| 9 | 339 | 395 | 345 | 414 | 356 | 413 | 106 | 120 | 155 | 109 | 469 | 444 | 442 | 478 | 502 | 506 | 0 |
| 8 | 388 | 339 | 395 | 345 | 414 | 356 | 158 | 106 | 120 | 155 | 494 | 469 | 444 | 442 | 478 | 502 | 0 |
| 7 | 344 | 388 | 339 | 395 | 345 | 414 | 132 | 158 | 106 | 120 | 499 | 494 | 469 | 444 | 442 | 478 | 0 |
| 6 | 404 | 344 | 388 | 339 | 395 | 345 | 113 | 132 | 158 | 106 | 473 | 499 | 494 | 469 | 444 | 442 | 0 |
| 5 | 349 | 404 | 344 | 388 | 339 | 395 | 165 | 113 | 132 | 158 | 440 | 473 | 499 | 494 | 469 | 444 | 1 |
| 4 | 383 | 349 | 404 | 344 | 388 | 339 | 135 | 165 | 113 | 132 | 453 | 440 | 473 | 499 | 494 | 469 | 0 |
| 3 | 367 | 383 | 349 | 404 | 344 | 388 | 105 | 135 | 165 | 113 | 502 | 453 | 440 | 473 | 499 | 494 | 0 |
| 2 | 369 | 367 | 383 | 349 | 404 | 344 | 158 | 105 | 135 | 165 | 505 | 502 | 453 | 440 | 473 | 499 | 0 |
| 1 | 373 | 369 | 367 | 383 | 349 | 404 | 133 | 158 | 105 | 135 | 528 | 505 | 502 | 453 | 440 | 473 | 0 |
| 0 | 375 | 373 | 369 | 367 | 383 | 349 | 107 | 133 | 158 | 105 | 501 | 528 | 505 | 502 | 453 | 440 | 0 |

T column group: 440T
V column group: 440V
P column group: 440P

CATEGORIZING AND PROCESSING TIME-SERIES DATA

BACKGROUND

The subject matter disclosed herein relates to improving the ability of computers to categorize and process time-series data.

Time-series data such as multi-variate numeric data provided by a set of sensors may be categorized in order to determine particular conditions or states of a system or process. While methods such as logistic regression analysis may be used for data categorization, factors such as data lag are not integrated into currently available approaches and methods.

SUMMARY OF THE INVENTION

A method for determining and processing relevant time-series data for a categorical response variable includes receiving time-series data for each variable of a plurality of explanatory variables, determining a least common period for the plurality of explanatory variables, forming a plurality of explanatory variable groups, receiving categorical data for a response variable corresponding to the plurality of explanatory variables, determining one or more selected explanatory variable groups of the plurality of explanatory variable groups, processing additional time-series data corresponding to the one or more selected explanatory variable groups. A corresponding computer program product and system are also disclosed herein.

A method for performing responses based on time-series data, includes executing the operations of the above method as well as receiving categorical data for a response variable corresponding to the time-series data, generating a response variable model using the selected explanatory variable groups, receiving additional time-series data corresponding to the selected explanatory variable groups, generating a categorization sequence for the additional time-series data using the response variable model, and performing one or more responses based on the categorization sequence.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The following definitions, which may be helpful in understanding the claimed invention, were formed from publically available sources such as Wikipedia and mathworks.com as well as the working knowledge of the inventors of the present invention.

Response variable: The outcome variable, also known as a dependent variable. As used herein, the response variable is a categorical variable such as a condition or state of a system or process.

Explanatory variable: A variable that is used to explain variability in the response variable, also known as an independent variable or predictor variable.

Linear Regression: A method of modeling the relationship between a scalar response variable and one or more explanatory variables using linear mathematics.

Logistic Regression: A regression model where the response variable (dependent variable) is categorical (including binary categories).

Matching Pursuit: Matching pursuit is a greedy algorithm that computes the best non-linear approximation to a data sequence using a dictionary whose entries may be referred to as "atoms." The dictionary may be complete and redundant. Preferably, a small (e.g., sparse) subset of the atoms are used to approximate the data sequence to a desired level of fidelity. At each step in the process, the best atom is selected by finding the atom having the largest magnitude inner product with a residual data sequence (e.g., the data prediction error) which is initially the data sequence itself.

Orthogonal Matching Pursuit: A form of matching pursuit where the residual is always orthogonal to the span of the atoms already selected. Conceptually, this can be done by using an orthonormal dictionary of atoms. Consequently, an orthogonal projection operator may be constructed that corresponds to the set of atoms already selected. The orthogonal projection operator may be used to update the residual data sequence. Orthogonal matching pursuit ensures that components in the span of previously-selected atoms are not introduced in subsequent steps.

Logistic Group Orthogonal Matching Pursuit (Logit-GOMP): A form of orthogonal matching pursuit proposed by Lozano et al. that extends the orthogonal matching pursuit procedure (also referred to as "forward greedy feature selection algorithm") to perform stage-wise group variable selection.

Figure 1:
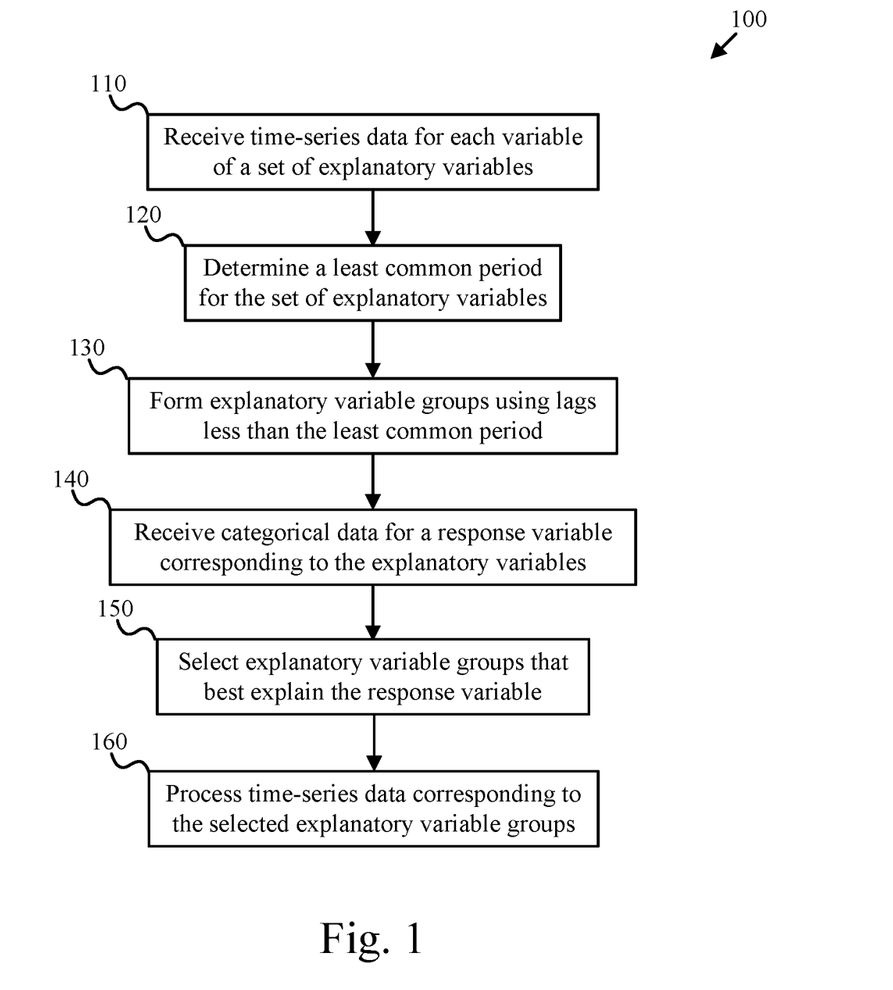
FIG. 1 is a flowchart of one example of a variable selection method in accordance with at least one embodiment disclosed herein.

FIG. 1 is a flowchart of one example of a variable selection method 100 in accordance with at least one embodiment disclosed herein. As depicted, the variable selection method 100 includes receiving 110 time-series data, determining 120 a least common period, forming 130 explanatory variable groups, receiving 140 categorical data, selecting 150 one or more explanatory variable groups, and processing 160 time-series data. The variable selection method 100 enables selection of explanatory variables that account for data lag.

Receiving 110 time-series data may include receiving time-series data for each variable of a set of explanatory variables. The time-series data may be numeric data that corresponds to a set of sensors or similar source of multivariate data. For example, a set of sensors may be deployed that provide input data for monitoring and/or controlling a system or process. Each sensor may correspond to an explanatory variable of the set of explanatory variables. The system or process may be any system or process that is monitored and/or controlled. Examples include manufacturing systems and processes, transportation systems and processes, logistic systems and processes, utility systems and processes, and data processing systems and processes.

Determining 120 a least common period may include determining a least common period (LCP) for the set of explanatory variables. In one embodiment, the least common period is determined according to the method depicted in FIG. 2.

Forming 130 explanatory variable groups may include forming explanatory variable groups using each lag that is less than the least common period. For example, if the least common period is 6 samples, lags ranging from 0 samples to 5 samples would be used. Consequently, for the described example each explanatory variable group would include time-series data for the corresponding explanatory variable with no lag (i.e., the original signal), and lags of 1, 2, 3, 4, and 5 samples. See FIG. 4C for an example.

Receiving 140 categorical data may include receiving categorical data for a response variable corresponding to the explanatory variables. In some embodiments, the categorical data is binary data that indicates the presence or absence of a selected condition such as an abnormal condition. The selected condition may correspond to a desired response that is used to control a system or process.

Selecting 150 one or more explanatory variable groups may include selecting explanatory variable groups that best explain the response variable. The selection may be based on at least one information metric, such as the Akaike information criteria (AIC), for models generated using one or more explanatory variable groups. In some embodiments, the explanatory variable groups are selected using a matching pursuit algorithm such as Logit-GOMP.

Processing (160) time-series data may include processing time-series data corresponding to the selected explanatory variable groups. In one embodiment, processing (160) time-series data includes conducting at least a portion of the data categorization method 300 depicted in FIG. 3.

Figure 2:
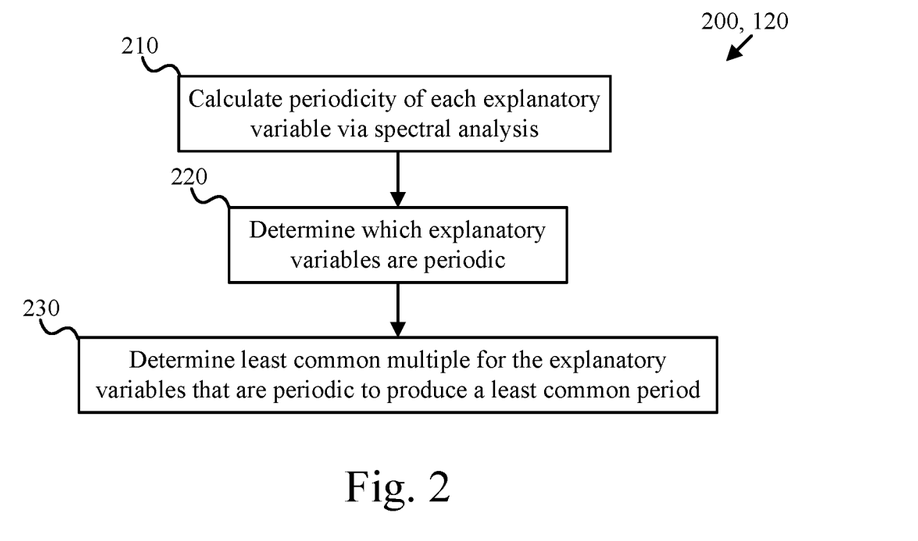
FIG. 2 is a flowchart of one example of a common period determination method in accordance with at least one embodiment disclosed herein.

FIG. 2 is a flowchart of one example of a common period determination method 200 in accordance with at least one embodiment disclosed herein. As depicted, the common period determination method 200 includes calculating (210) periodicities, determining (220) periodic explanatory variables, and determining (230) a least common period. The common period determination method 200 is one example of the determining operation 120 of the variable selection method 100 depicted in FIG. 1.

Calculating (210) periodicities may include calculating a periodicity of each explanatory variable corresponding to a response variable. The periodicity may be determined via spectral analysis of the sampled data for the particular explanatory variable. In some embodiments, a Fast Fourier Transform is performed on the response variable data and the periodicity is computed from the frequency of the strongest spectral component. In one embodiment, the periodicity is computed from a frequency corresponding to the centroid of the spectral components between the valleys that are nearest to the strongest spectral component. Computing a centroid may increase the accuracy of the computed periodicity.

Determining (220) periodic explanatory variables may include determining if the magnitude of the strongest spectral component is above a selected threshold. Using a selected threshold may eliminate selecting spectral components from data that is not periodic and/or noisy data. In one embodiment, the period of such data is assumed to be one sample.

Determining (230) a least common period may include computing the least common multiple of the periodic explanatory variables (which may include those that are assumed to be periodic). For example, if the period of three different explanatory variables were 2, 3, and 4 periods, respectively, the least common multiple of those periods would be 12 periods. Therefore, the least common period would also be 12 periods.

Figure 3:
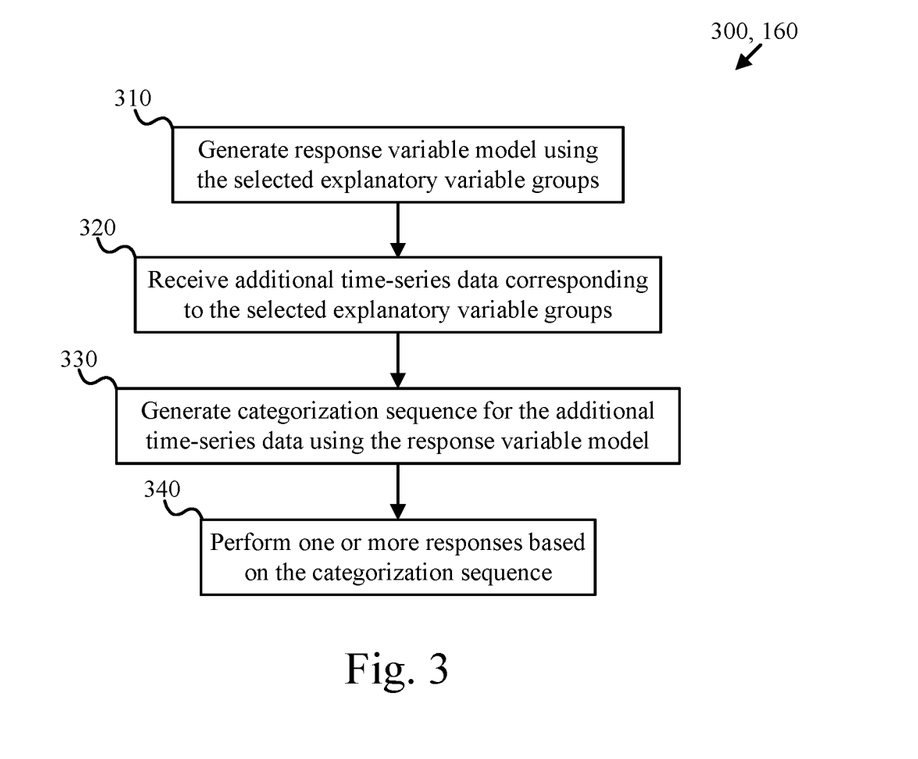
FIG. 3 is a flowchart of one example of a data categorization method in accordance with at least one embodiment disclosed herein.

FIG. 3 is a flowchart of one example of a data categorization method 300 in accordance with at least one embodiment disclosed herein. As depicted, the data categorization method 300 includes generating (310) a response variable model, receiving (320) additional time-series data, generating (330) a categorization sequence, and performing (340) one or more responses. The data categorization method 300 may be conducted in conjunction with the processing operation 160 of the variable selection method 100 depicted in FIG. 1.

Generating (310) a response variable model may include using selected explanatory variable groups in generating the model. The explanatory variable groups may be selected using a matching pursuit algorithm such as Logit-COMP. The model may be generating according to a variety of approaches including those known to those of skill in the art of temporal causal modeling such as graphical granger modeling methods and autoregressive methods. In some embodiments, the response variable model is generated using a training dataset.

Receiving (320) additional time-series data may include receiving time-series data that needs to be categorized. In some embodiments, the data corresponds to a set of sensors. In certain embodiments, the data is real-time data. The data may correspond to the selected explanatory variable groups or be pruned to correspond to the selected explanatory variable groups. Generating (330) a categorization sequence may include processing the received time-series data using the selected model and determining a category for the response variable for each row (e.g., time index) in the time-series data.

Performing (340) one or more responses may include mapping the determined category for the response variable at each time index to a corresponding response which may include a null response. The response may adjust a system or process and/or initiate an alarm. In some embodiments, a response is performed only when a change occurs in the determined category.

Figure 4A:
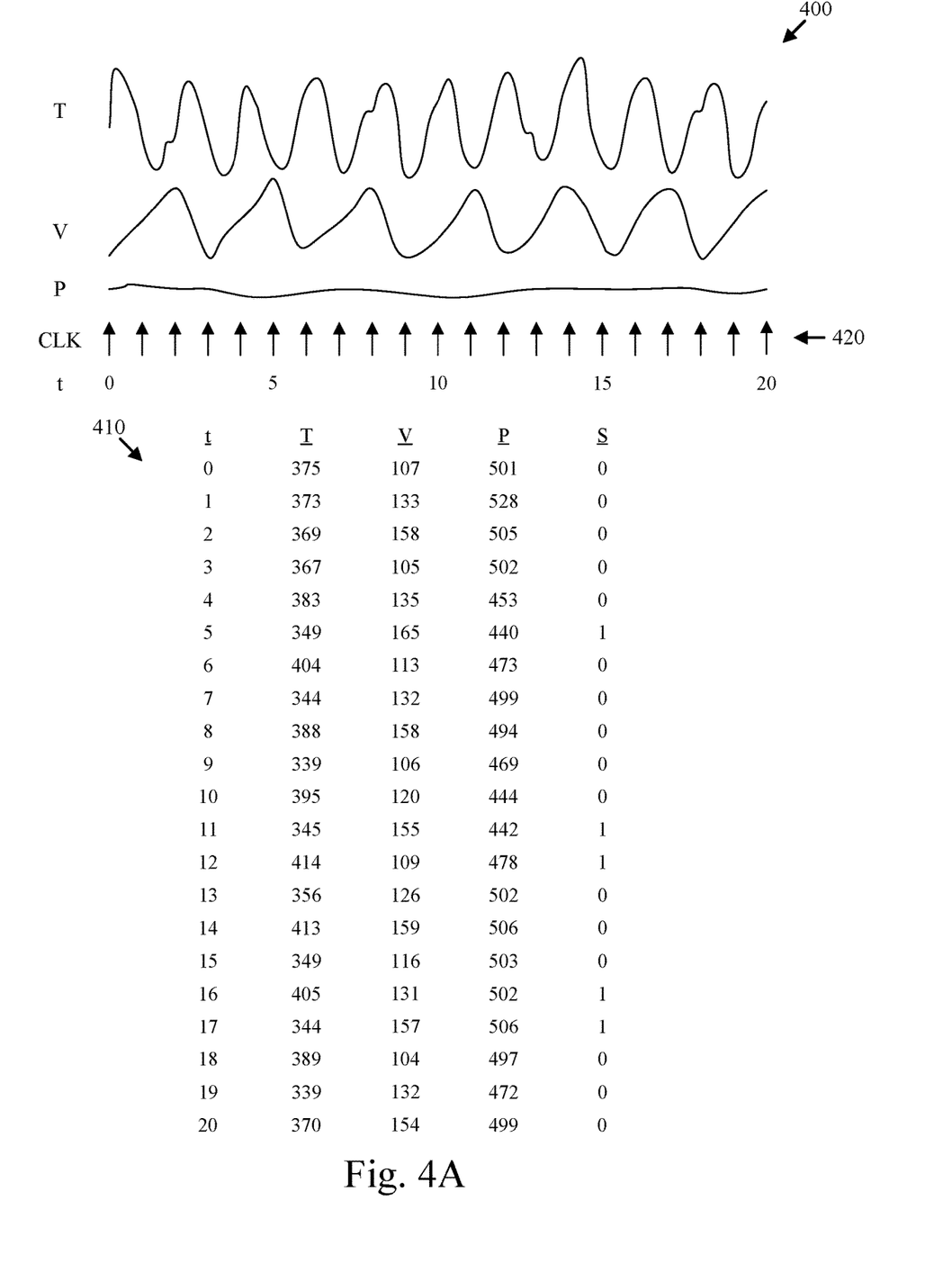
FIG. 4A is a graph and associated table of one example of sensor data in accordance with at least one embodiment disclosed herein.

FIG. 4A is a graph and associated table of one example of sensor data 400 in accordance with at least one embodiment disclosed herein. As depicted, the sensor data 400 includes a number of data samples 410 collected from a set of sensors (not shown). In the depicted example, the sensor data is continuous numeric data that is sampled to provide discrete values at a selected rate (i.e., a set of data sequences) according to a sampling clock 420.

For purposes of illustration, the depicted example includes a temperature data sequence 'T,' a voltage data sequence 'V,' and a pressure data sequence 'P.' One of skill in the art will appreciate that the data sequences provided by sensors may not be calibrated to particular physical units but may correlate to physical units relevant to a system or process.

The depicted example also includes a categorical sequence 'S,' which for illustrative purposes is a state sequence (i.e., response variable) 'S' for a system or process. In the depicted example, the categorical sequence 'S' is a desired response and the data samples 410 are used as training data.

Figure 4B:
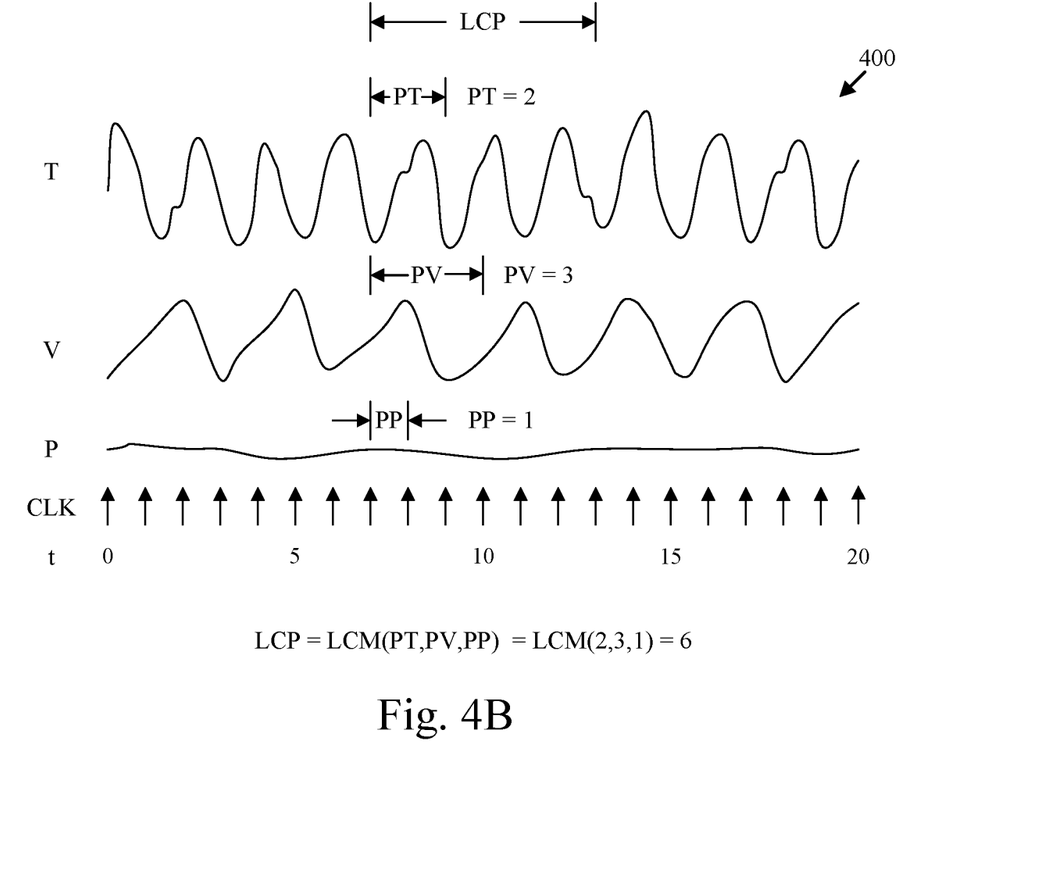
FIG. 4B is a graph and associated equations of one example of determining a least common period in accordance with at least one embodiment disclosed herein.

As shown in FIG. 4B, a least common period of the 'T,' 'V,' and 'P' data sequences can be found by determining the periods of the individual data sequences and computing the least common multiple of the calculated periods. For example, the periods of the 'T,' 'V,' and 'P' data sequences is 2 samples, 3 samples, and 1 sample respectively. Consequently, the least common period is for the sensor data 400 is the least common multiple of 2 samples, 3 samples, and 1 sample which is 6 samples.

Figure 4C:
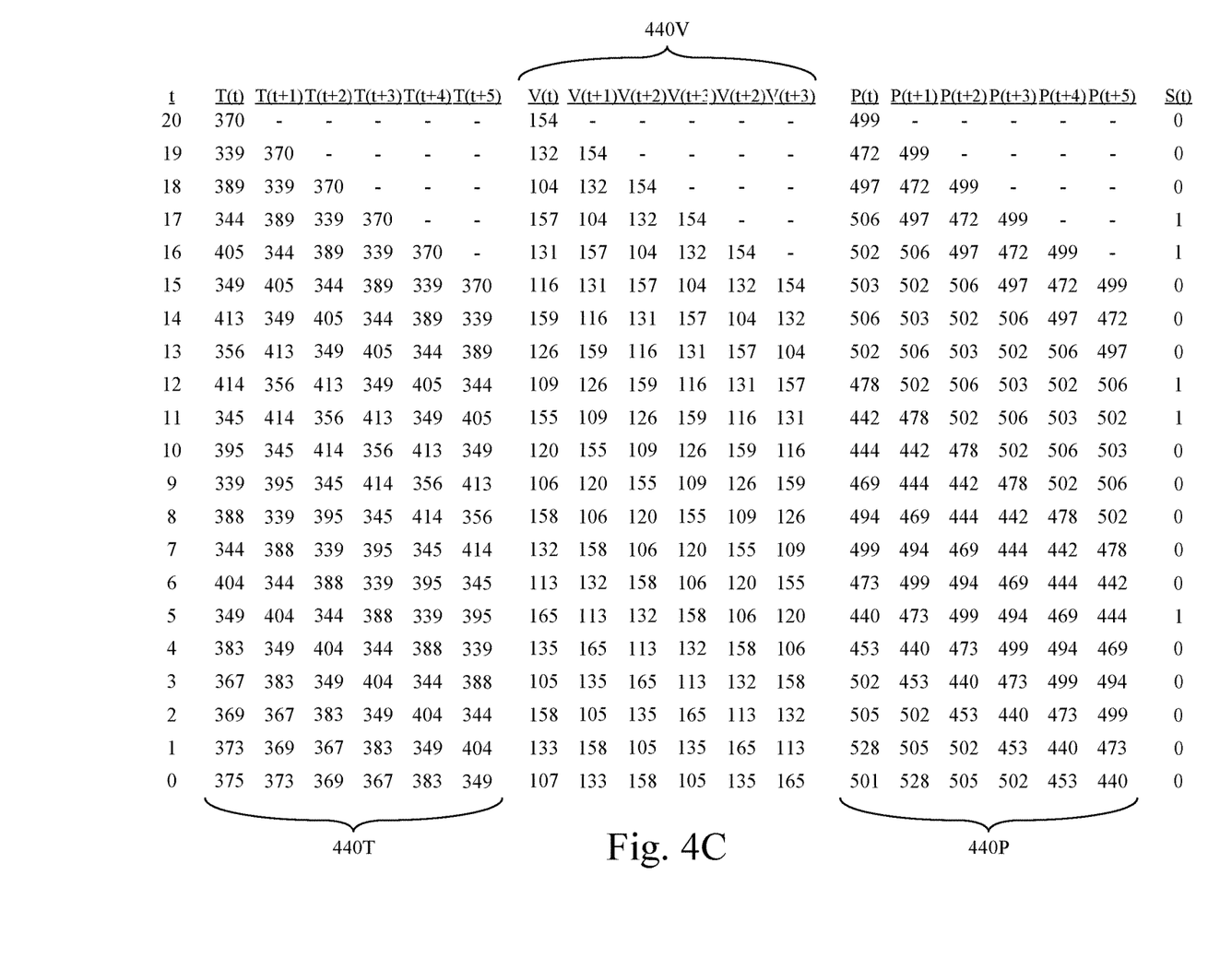
FIG. 4C is a table of one example of forming explanatory variable groups in accordance with at least one embodiment disclosed herein.

As shown in FIG. 4C, explanatory variable groups 440 can be formed for each selected explanatory variable by using lags that are less than or equal to the least common period. In the depicted example, the 'T,' 'V,' and 'P' data sequences with lags of 0 to 5 samples are assembled to form the explanatory variable groups 440T, 440V, and 440P, respectively. The formed explanatory variable groups can be used to generate a response variable model for the response variable 'S.' The response variable model can then be used to categorize additional explanatory data and thereby generate the response variable 'S' for the additional explanatory data.

Figure 5A:
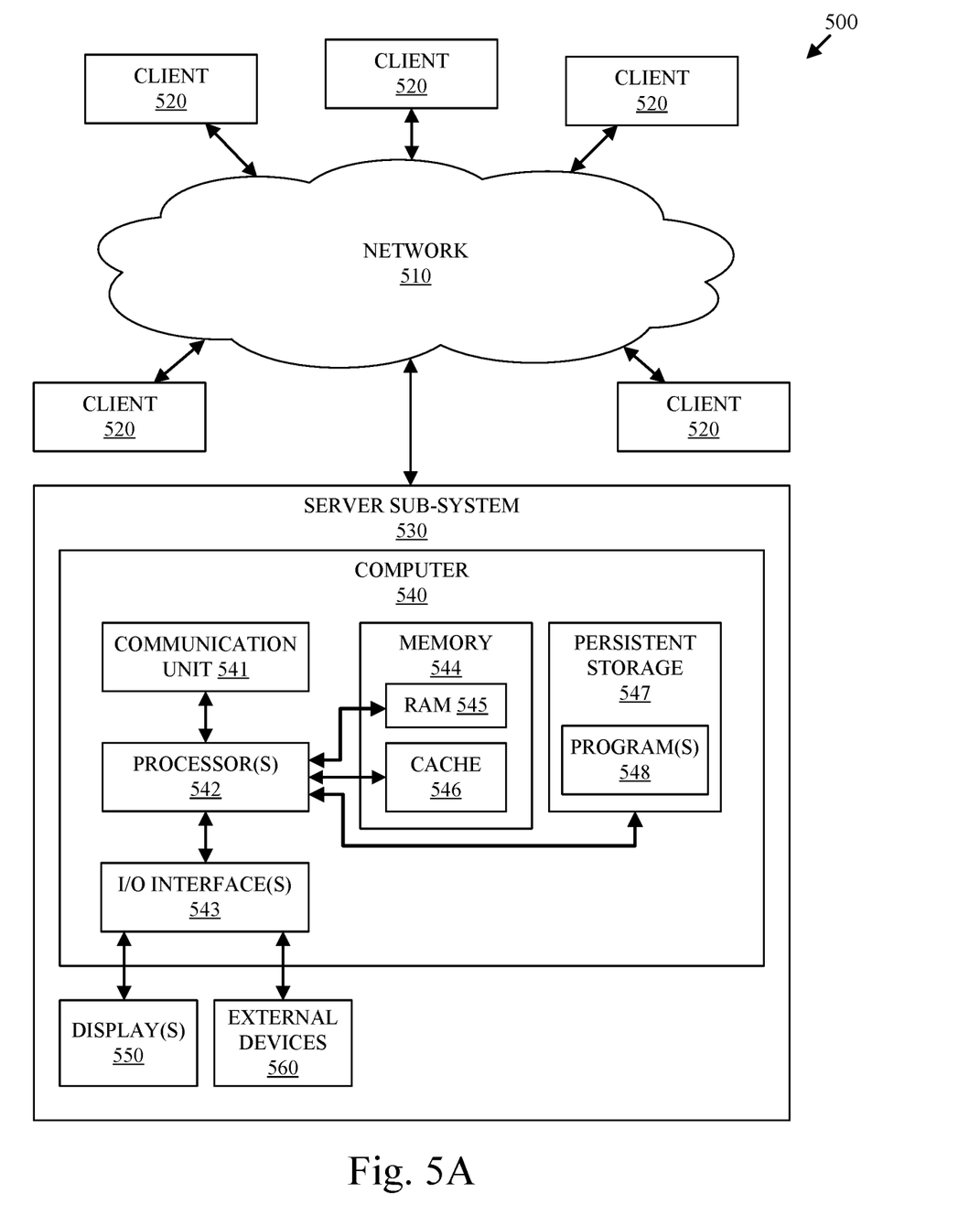
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e, main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), a desktop computer, a personal digital assistant (PDA), a smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices such as the clients 520 and other subsystems 530 via communication network 510. Communication network 510 can be, for example, a local area network (LAN), a wide area network (WAN), such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric that provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer readable storage media. In general, memory 544 can include any suitable volatile or non-volatile computer readable storage media. It is further noted that, now and/or in the near future: (i) external device(s) 560 may be able to supply, some or all, memory for subsystem 530; and/or (ii) devices external to subsystem 530 may be able to provide memory for subsystem 530.

The depicted programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer readable storage medium that is also part of persistent storage 547.

Communications unit 541, in the depicted example, provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, a touch screen, and/or some other suitable input device. External device set 560 can also include portable computer readable storage media such as, for example, thumb drives, portable optical or magnetic disks, and memory cards. Software and data used to practice embodiments of the present invention, for example, programs 548, can be stored on such portable computer readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
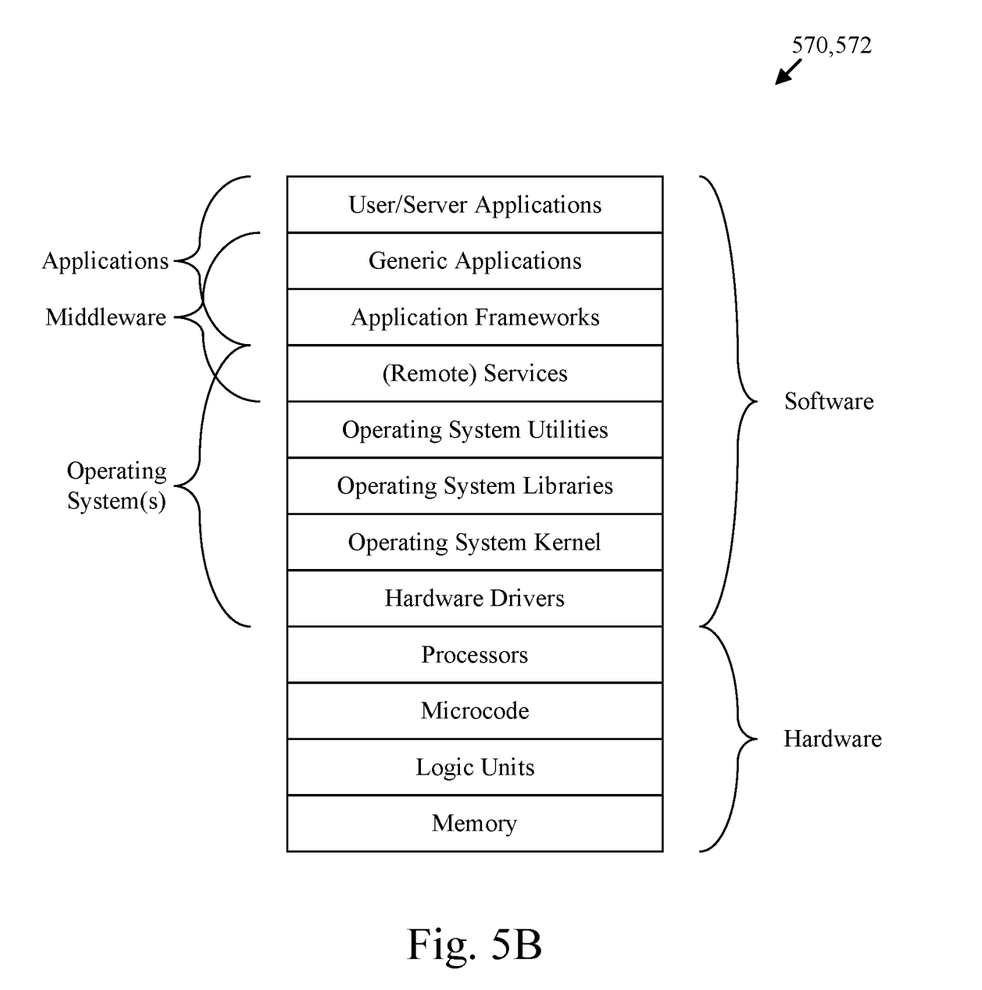
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, and middleware layers associated with executing middleware that expands and/or improves the functionality of hardware layers and executing operating system(s). The software layers may also include various application-specific layers. The application-specific layers may include application frameworks that further expand on, and/or improve upon, the functionality of hardware layers and operating system layers. One of skill in the art will appreciate that functionality initially provided by upper layers, such as an application layer, may eventually be wholly or partially incorporated into lower layers, such as an operating system layer or a hardware layer as the functionality becomes more pervasive.

The memory layer may include volatile memory, non-volatile memory, persistent storage, and hardware associated with controlling such memory. The logic units may include CPU's, arithmetic units, graphic processing units and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, gaming frameworks, and the like. An application framework may support application development for a specific environment or industry. In some cases, application frameworks are available for multiple operating systems and providing a common programming interface to developers across multiple platforms.

Generic applications include applications that are need by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. In some embodiments, the present invention improves the functioning of a computer 540 that functions as a data analysis server to the client devices 510. Within such a data analysis server or other computing devices, the present invention may improve various software layers such as a server application, an application framework or an operating system library. One of skill in the art will also appreciate that the depicted layers, which are given by way of example, are not representative of all computing devices. Nevertheless, the concept of improving the computer itself by improving one or more functional layers, including software layers, is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, executed by one or more processors, for determining and processing relevant time-series data for a categorical response variable, the method comprising:
    receiving, via the one or more processors, time-series data for each variable of a plurality of explanatory variables;
    determining, via the one or more processors, a least common period for the plurality of explanatory variables;
    forming, via the one or more processors, an explanatory variable group for each of the plurality of explanatory variables using lags less than the least common period;
    receiving, via the one or more processors, categorical data for a response variable corresponding to the time-series data;
    determining, via the one or more processors, a plurality of selected explanatory variable groups of the plurality of explanatory variable groups;
    processing, via the one or more processors, additional time-series data for each of the plurality of selected explanatory variable groups;
    producing, via the one or more processors, a categorization sequence for the additional time-series data based on the plurality selected explanatory variable groups; and
    adjusting, via the one or more processors, a system or process corresponding to the additional time-series data base on the categorization sequence.

2. The method of claim 1, wherein determining the least common period comprises determining, via the one or more processors, a periodicity of each variable of the plurality of explanatory variables.

3. The method of claim 2, wherein determining the least common period comprises determining, via the one or more processors, a least common multiple of the periods of the plurality of explanatory variables.

4. The method of claim 2, wherein determining the least common period comprises determining, via the one or more processors, which variables of the plurality of explanatory variables are periodic.

5. The method of claim 2, wherein determining the periodicity comprises conducting, via the one or more processors, spectral analysis.

6. The method of claim 1, wherein processing, via the one or more processors, additional time-series data comprises using a response variable model based on the selected explanatory variable groups.

7. The method of claim 1, further comprising performing, via the one or more processors, one or more responses based on the categorization sequence.

8. The method of claim 7, wherein performing the one or more responses comprises adjusting, via the one or more processors, the system or process corresponding to the additional time-series data.

9. A computer program product for determining and processing relevant time-series data for a categorical response variable, the computer program product comprising a computer readable storage medium having program instructions embodied therewith, wherein the computer readable storage medium is not a transitory signal per se, the program instructions executable by a processor to cause the processor to conduct a method comprising:
    receiving, via the one or more processors, time-series data for each variable of a plurality of explanatory variables;
    determining, via the one or more processors, a least common period for the plurality of explanatory variables;
    forming, via the one or more processors, an explanatory variable group for each of the plurality of explanatory variables using lags less than the least common period;
    receiving, via the one or more processors, categorical data for a response variable corresponding to the time-series data;
    determining, via the one or more processors, a plurality of selected explanatory variable groups of the plurality of explanatory variable groups;
    processing, via the one or more processors, additional time-series data for each of the plurality of selected explanatory variable groups;

processing, via the one or more processors, additional time-series data corresponding to the one or more selected explanatory variable groups;

producing, via the one or more processors, a categorization sequence for the additional time-series data based on the plurality selected explanatory variable groups; and adjusting, via the one or more processors, a system or process corresponding to the additional time-series data base on the categorization sequence.

10. The computer program product of claim 9, wherein determining the least common period comprises determining, via the one or more processors, a periodicity of each variable of the plurality of explanatory variables.

11. The computer program product of claim 10, wherein determining the least common period comprises determining, via the one or more processors, a least common multiple of the periods of the plurality of explanatory variables.

12. The computer program product of claim 10, wherein determining the least common period comprises determining, via the one or more processors, which variables of the plurality of explanatory variables are periodic.

13. The computer program product of claim 10, wherein determining the periodicity comprises conducting, via the one or more processors, spectral analysis.

14. The computer program product of claim 9, wherein processing additional time-series data comprises using, via the one or more processors, a response variable model based on the selected explanatory variable groups.

15. The computer program product of claim 9, wherein processing additional time-series data comprises producing, via the one or more processors, a categorization sequence for the additional time-series data using the response variable model.

16. The computer program product of claim 15, wherein the method further comprises performing, via the one or more processors, one or more responses based on the categorization sequence.

17. The computer program product of claim 16, wherein performing the one or more responses comprises adjusting, via the one or more processors, a system or process corresponding to the additional time-series data.

18. A method for performing responses based on time-series data, the method comprising:

receiving, via the one or more processors, time-series data for each variable of a plurality of explanatory variables;

determining, via the one or more processors, a least common period for the plurality of explanatory variables;

forming, via the one or more processors, an explanatory variable group for each of the plurality of explanatory variables using lags less than the least common period;

receiving, via the one or more processors, categorical data for a response variable corresponding to the plurality of explanatory variables;

determining, via the one or more processors, a plurality of selected explanatory variable groups of the plurality of explanatory variable groups;

generating, via the one or more processors, a response variable model using the plurality of selected explanatory variable groups;

receiving, via the one or more processors, additional time-series data corresponding to the plurality of selected explanatory variable groups;

generating, via the one or more processors, a categorization sequence for the additional time-series data using the response variable model; and adjusting, via the one or more processors, a system or process corresponding to the additional time-series data base on the categorization sequence.

19. The method of claim 18, wherein determining the least common period comprises determining, via the one or more processors, a periodicity of each variable of the plurality of explanatory variables using spectral analysis and determining a least common multiple of the periods of the plurality of explanatory variables.

* * * * *